United States Patent [19]

Osaki et al.

[11] Patent Number: 5,163,099
[45] Date of Patent: Nov. 10, 1992

[54] IMAGING APPARATUS HAVING A DETECTOR FOR DETERMINING THE PRESENCE OF CONTRASTING PORTIONS IN A VIEWED OBJECT

[75] Inventors: Eiji Osaki, Yokohama; Kazuo Kondo, Kawasaki, both of Japan

[73] Assignee: Kabushiki Kaisha Toshiba, Kawasaki, Japan

[21] Appl. No.: 334,557

[22] Filed: Apr. 7, 1989

[30] Foreign Application Priority Data

May 23, 1988 [JP] Japan .................................. 63-125122
Feb. 2, 1989 [JP] Japan .................................... 1-22516

[51] Int. Cl.⁵ .............................................. G06K 9/00
[52] U.S. Cl. ......................................... 382/17; 382/10
[58] Field of Search ................................ 382/17, 10, 8

[56] References Cited
U.S. PATENT DOCUMENTS 4,912,770 3/1990 Sato et al. .............................. 382/17

OTHER PUBLICATIONS

Rosenfeld and Avinash C. Kak, Digital Picture Processing 1982 p. 251 Second Edition vol. 1 Academic Press.

Primary Examiner—David K. Moore
Attorney, Agent, or Firm—Cushman, Darby & Cushman

[57] ABSTRACT

An imaging apparatus includes an imaging device, a transformer and a detecting device. The imaging device generates image signals corresponding to the appearance of a physical object which includes contrasting portions. The transformer transforms the image signals into a power spectrum signal having a signal level which varies in relation to the contrasting portions in the appearance of the object at a specified time. The transformation to a power spectrum signal may be performed by adding the image signals and then perform Fourier transformation on the resultant sum, or by performing Fourier transformation on each image signal and summing the respective transforms of the image signals.

16 Claims, 10 Drawing Sheets

IMAGING APPARATUS HAVING A DETECTOR FOR DETERMINING THE PRESENCE OF CONTRASTING PORTIONS IN A VIEWED OBJECT

BACKGROUND OF THE INVENTION

1. Field of the Invention

This invention relates to an image detecting apparatus. More specifically, the invention relates to an apparatus for detecting selected patterns, such as characters printed on an object.

2. Description of the Related Art

Generally in this type of apparatus, an imaging device, such as a CCD (charge coupled device) camera, picks up an image of an object and produces an image signal. In the case of detecting characters printed on the object or flaws which exist on the object, the image signal from the imaging means is converted into a binary signal.

After conversion into the binary signal, a high level of the binary signal corresponds to characters or flaws on the object. Accordingly, when the binary signal is compared with a reference signal, a selected output signal corresponding to characters or flaws can be detected. The selected output signal is supplied to a displaying circuit to display whether a specified type of image appears in the image of the object. In this apparatus, however, if the object is a metal plate and characters are printed on this metal plate, a subtle variable-density image is formed on the metal plate in accordance with the finishing state of the surface of the metal plate, the arrangement of the imaging device and the illumination of the plate. Consequently, it is difficult to extract a signal corresponding to characters or flaws because the signal level corresponding to characters or flaws is almost equal to that generated by the metal plate as a background.

When the image to be detected is printed matter other than characters, the same problem as mentioned above occurs if the brightness of the image to be detected is similar to that of the object. According to the manner of this related art, it is more difficult to detect a selected image on the object when the object is being moved, such as during a production process or assembly line in a factory.

SUMMARY OF THE INVENTION

It is an object of the present invention to detect a selected type of pattern easily and accurately from an electronic image of an object.

It is a further object of the present invention to detect a selected type of pattern from an electronic still image.

It is still a further object of the present invention to detect a selected type of pattern from a changing electronic image.

To achieve the objects and in accordance with the purpose of the invention, as embodied and broadly described herein, the invention comprises imaging means for generating image signals corresponding to the appearance of a physical object, the appearance including contrasting portions; means for transforming the image signals into a power spectrum signal having a level which varies in relation to the contrasting portions in the appearance of the object at a specified time; and detecting means for generating a detecting signal corresponding to the presence of a selected type of image pattern on the object when the level of the power spectrum signal exceeds a predetermined reference level.

BRIEF DESCRIPTION OF THE DRAWINGS

The present invention is best understood with reference to accompanying drawings in which.

DESCRIPTION OF THE PREFERRED EMBODIMENTS

Figure 1:
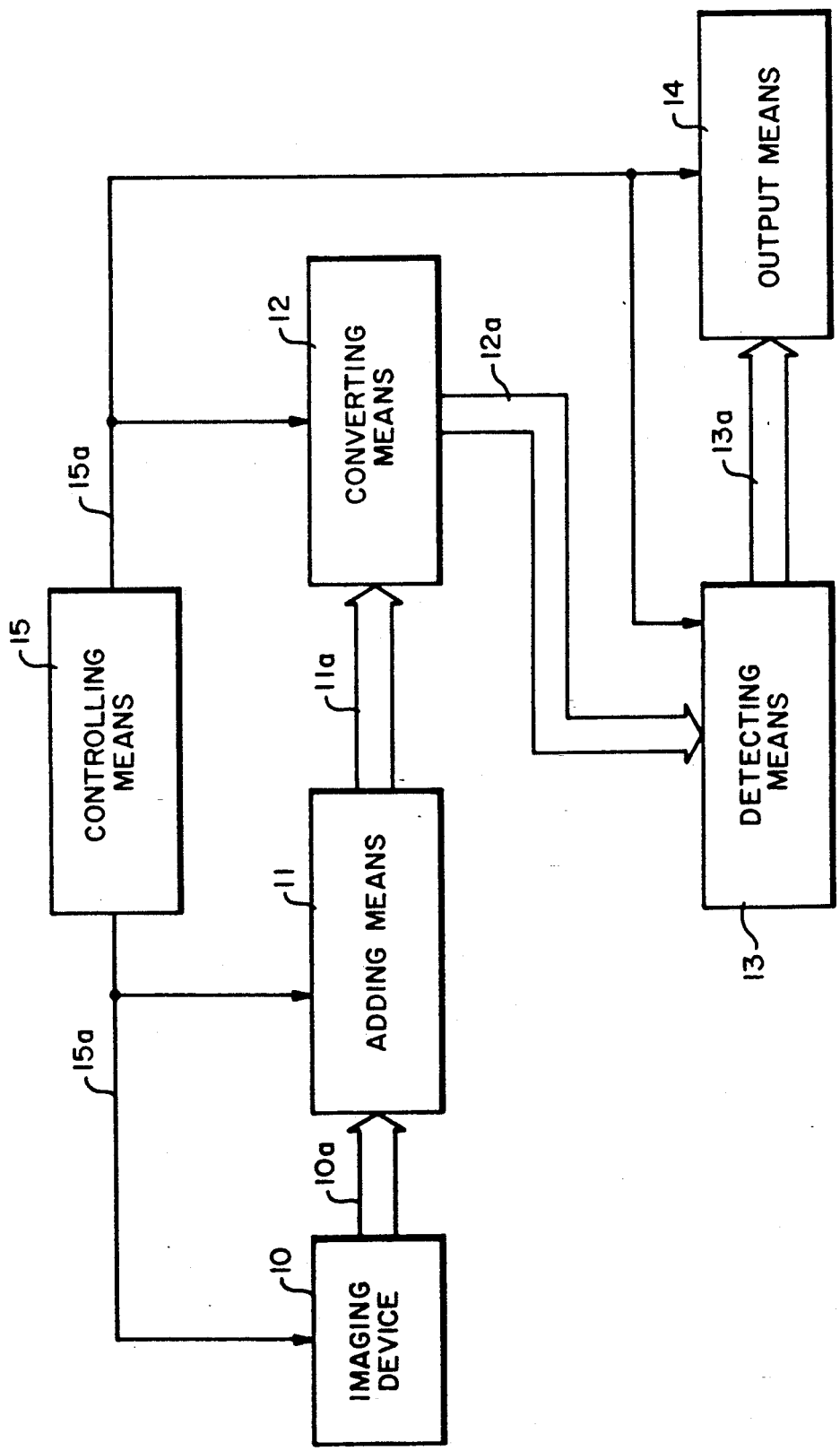
FIG. 1 is a block diagram of an imaging apparatus according to on embodiment of this invention.

Referring to the accompanying drawings, an embodiment of the present invention will be described. However, in the drawings, the same numerals are applied to the similar elements in the drawings, and therefore the detailed description thereof is not repeated.

As shown in FIG. 1, the imaging device 10 is a device for picking-up images of objects and producing image signals corresponding to the appearance of the objects. The imaging device 10 may be a CCD (Charge Coupled Device) camera. In the imaging device 10, the image signals are converted into digital image signals to be supplied to adding means 11 through a data bus 10a. The addition means 11 executes adding of the digital image signals that are adjacent in one direction on a picture and supplies resultant signals to converting means 12 through a data bus 11a.

The converting means 12 changes the output signal of the adding means 11 received through the data bus 11a into a power spectrum signal.

The power spectrum signal has a level which varies in relation to contrasting portions in the appearance of the object at a specified time, and is supplied to detecting means 13 through a data bus 12a.

The detecting means 13 compares the level of the power spectrum signal with a reference signal level. In the event the power spectrum signal level is higher than a reference signal level, the detecting means 13 decides that a selected type of pattern, such as characters, exist on the object and supplies a detecting signal to output means 14 through a data bus 13a.

The output means 14 produces a signal which shows whether a selected type of pattern exists on the object. The output means 14 may be visual displaying device, such as a CRT, an LCD, or an LED, or may be a printing device, such as a thermal transfer printer. Further, the output means 14 may be an output circuit for producing a signal to stop a production process or assembly line in a factory when a flaw is found on a material.

The imaging device 10, the adding means 11, the converting means 12, the detecting means 13 and the output means 14 are connected with a control bus 15a and are controlled by controlling means 15, as mentioned above.

Figure 2:
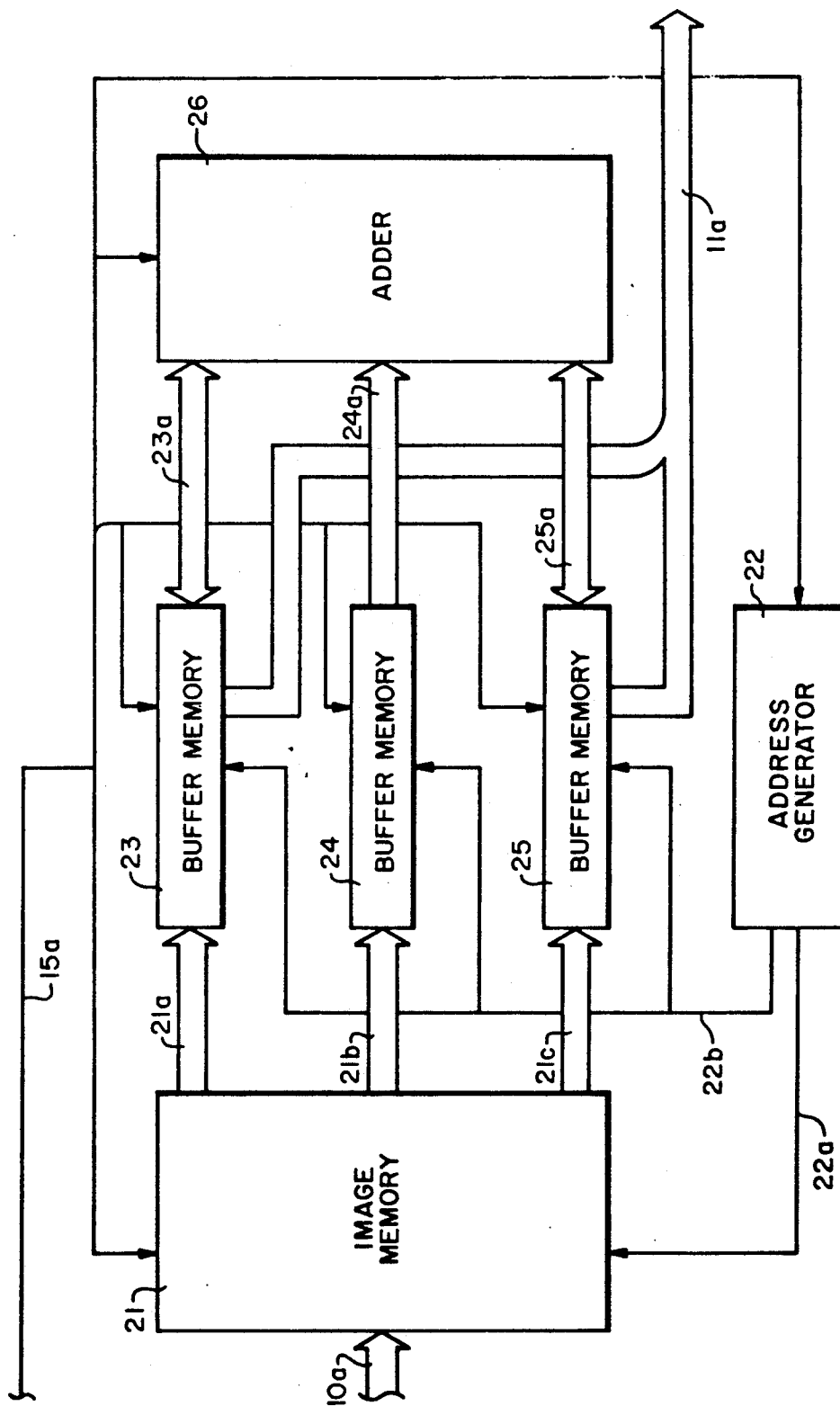
FIG. 2 is a detailed block diagram of the adding means shown in FIG. 1.

FIG. 2 is a detailed block diagram of the adding means 11 shown in FIG. 1. An image memory 21 has a capacity for storing image data corresponding to one picture of the imaging device 10 and stores the image data received from a data bus 10a. One picture of the imaging device 10 has, for instance, 512×512 picture cells. Of course, the image memory 21 may store more data or less data than the image data corresponding to one picture of the imaging device 10.

An address generator 22 accesses the image memory 21 through an address bus 22a and image data from the image memory 21 are supplied to buffer memories 23, 24, 25 through data busses 21a, 21b and 21c respectively, for temporary storage. The address generator 22 also accesses the buffer memories 23, 24 and 25 through an address bus 22b.

One buffer memory can store a defined portion of the image data corresponding to 512 picture cells at a one time.

Data held in buffer memories 23, 24 and 25 are supplied to an adder 26 through data buses 23a, 24a and 25a, respectively. The adder 26 adds the defined portions of the image data held in two of the buffer memories 23, 24 and 25, and the resultant data are stored in one of buffer memories 23 and 25. Finally all data corresponding to one picture can be added by the adding operation. Therefore the adding means 11 can combine the image signals into a combined picture signal corresponding to the appearance of the object at the specified time. The image memory 21, the address generator 22, the buffer memories 23, 24 and 25 and the adder 26 are connected to controlling means 15, shown in FIG. 1, through the control bus 15a, and the adding operations, as mentioned above, are controlled.

Figure 3A:
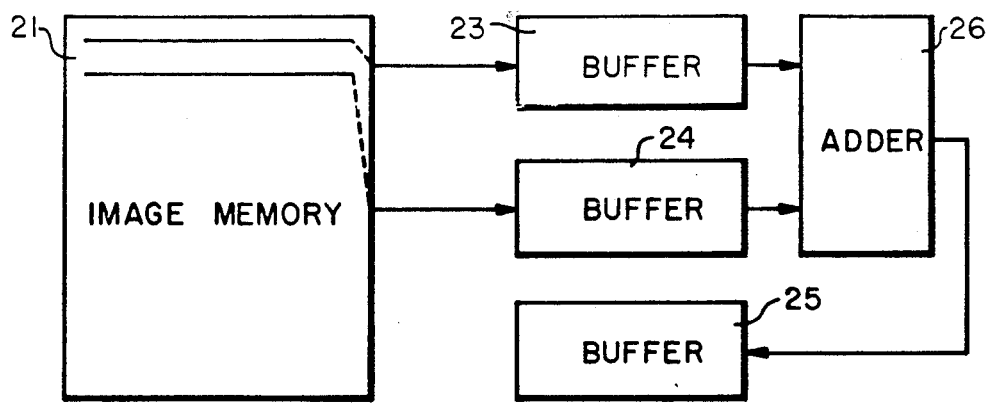
FIGS. 3(a), 3(b) and 3(c) illustrate an adding operation of the adding means shown in FIG. 2.
Figure 3B:
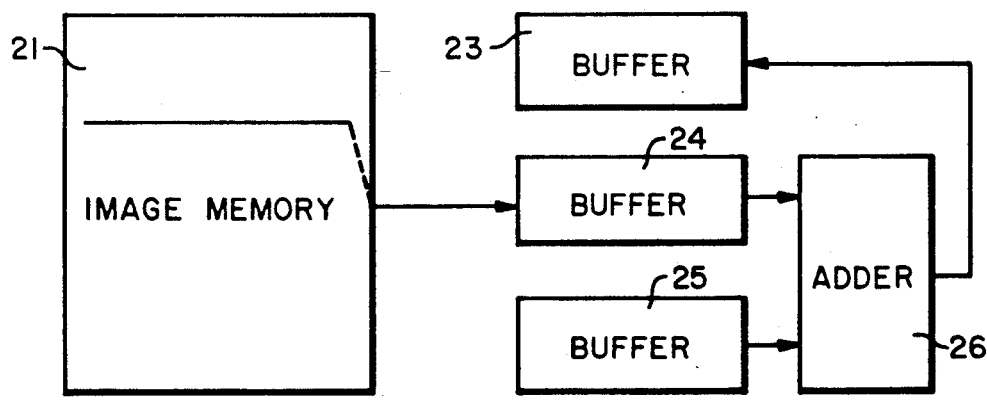
Figure 3C:
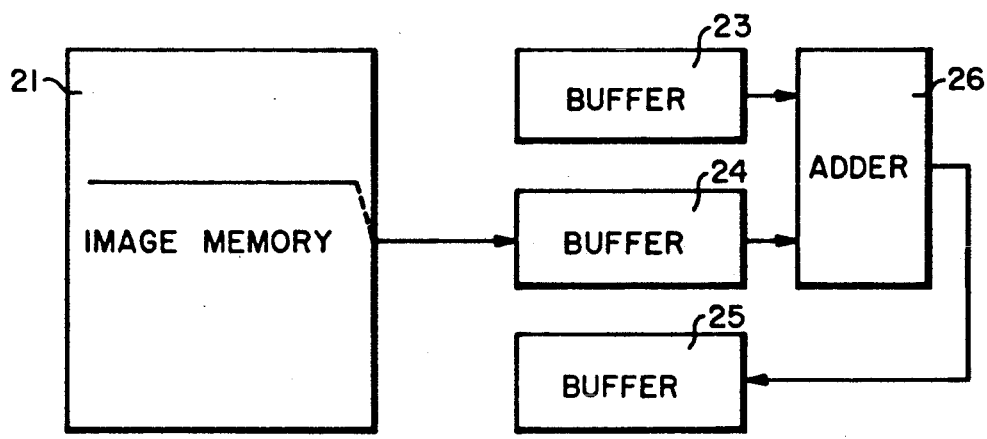

FIG. 3 illustrates the adding operation of the adding means shown in FIG. 2. At first, the buffer memories 23, 24 store the defined portions of the image data corresponding to two lines of one picture, which is stored in the image memory 21. The data stored in the buffer memories 23, 24 are added in the adder 26 and the adding result is held in the buffer memory 25, as shown in FIG. 3(a). In the next adding operation, shown in FIG. 3(b), the data corresponding to the next successive line of the picture is stored in the buffer memory 24, and this data is added to the data stored in the buffer memory 25 by the previous adding operation. The resultant data is stored in the buffer memory 23. Moreover, as shown in FIG. 3(c), the data of a next successive line from the image memory 21 is stored in the buffer memory 24. Thereafter, the sum of the data in the buffer memory 23 and the buffer memory 24 is stored in the buffer memory 25. The resultant data which is obtained by repeating the above operation, represents the successive sum of data for plural portions of one picture, and is supplied to the converting means 12 through the data bus 11a.

Figure 4:
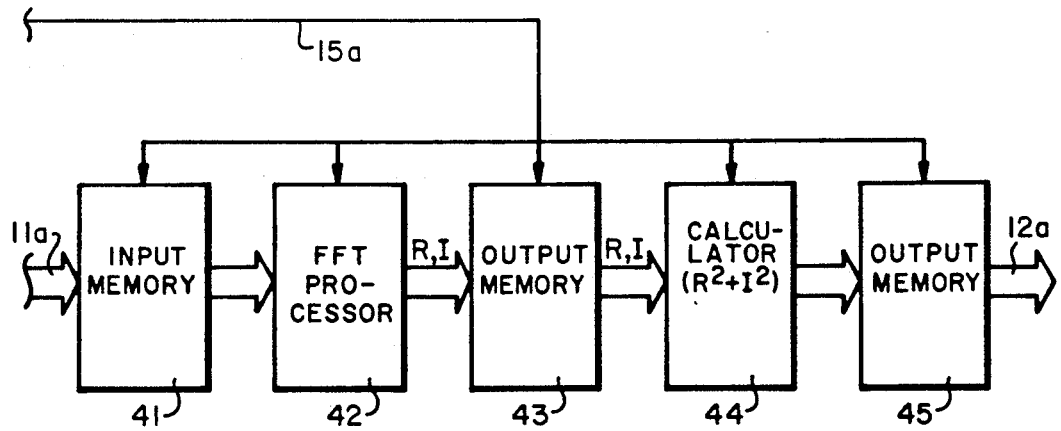
FIG. 4 is a detailed block diagram of the converting means shown in FIG. 1.

FIG. 4 is a detailed block diagram of the converting means 12 shown in FIG. 1. The image data from the data bus 11a is stored in an input memory 41 to be supplied to a fast fourier transforming (FFT) processor 42.

The processor 42 has 512 points, for instance, and generates fourier frequency spectrum data as output data. The output data is supplied to a first output memory 43 in the form of complex data which include real part data (R) and imaginary part data (I). These real part data (R) and imaging part data (I) are squared respectively and power spectrum data ($R^2+I^2$) are obtained in a calculator 44, which includes a multiplier and an adder. The power spectrum data from the calculator 44 are held in a second output memory 45 and are supplied to the detecting means 13 through the data bus 12a.

Figures 5A, 5B:
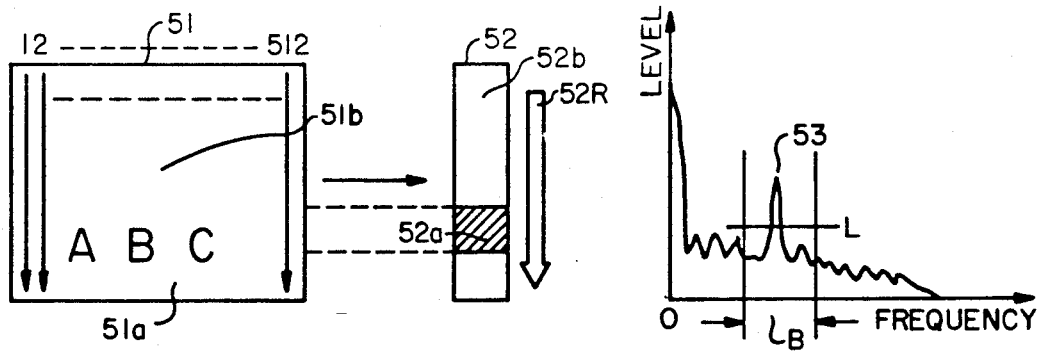
FIG. 5(a) and 5(b) illustrate operations of the adding means and the converting means shown in FIG. 1.

FIGS. 5(a) and 5(b) illustrate operations of the adding means 11 and the converting means 12 shown in FIG. 1 when an input image of the adding means 11 is an electronic still image, that is, the image signal picked-up by the imaging device 10 has no stream or motion. In this case, one image 51 obtained by the imaging device 10 is shown in FIG. 5(a). The characters (A B C) 51a in the output image 51 indicate the characters printed on the object. The image memory 21 shown in FIG. 2 stoves image data corresponding to 512 lines of one image 51.

These data are summed as described with respect to FIG. 3 to combine the image data into combined picture data 52 corresponding to the appearance of the object at the specified time. The image of the characters (A B C) 51a and the background 51b correspond to combined data 52a, 52b, respectively, in FIG. 5(a). These combined data are converted into a power spectrum level data, shown in FIG. 5(b). This conversion is executed by using one dimensional fourier transformation in one direction shown by arrow 52R.

When the object and the imaging device 10 are fixed, the output image of the imaging device 10 has no stream. In this case, the power spectrum of the combined signal has a feature 53 on a frequency range, as shown in FIG. 5(b). The level of the combined signal is small for background areas of the image and the level of the combined signal is emphasized or high for areas of the image having characters. Therefore, if a signal having a higher level than the reference level L is present in a given frequency of the power spectrum, this means that a feature, such as a character, exists on the image of the object.

Figure 6:
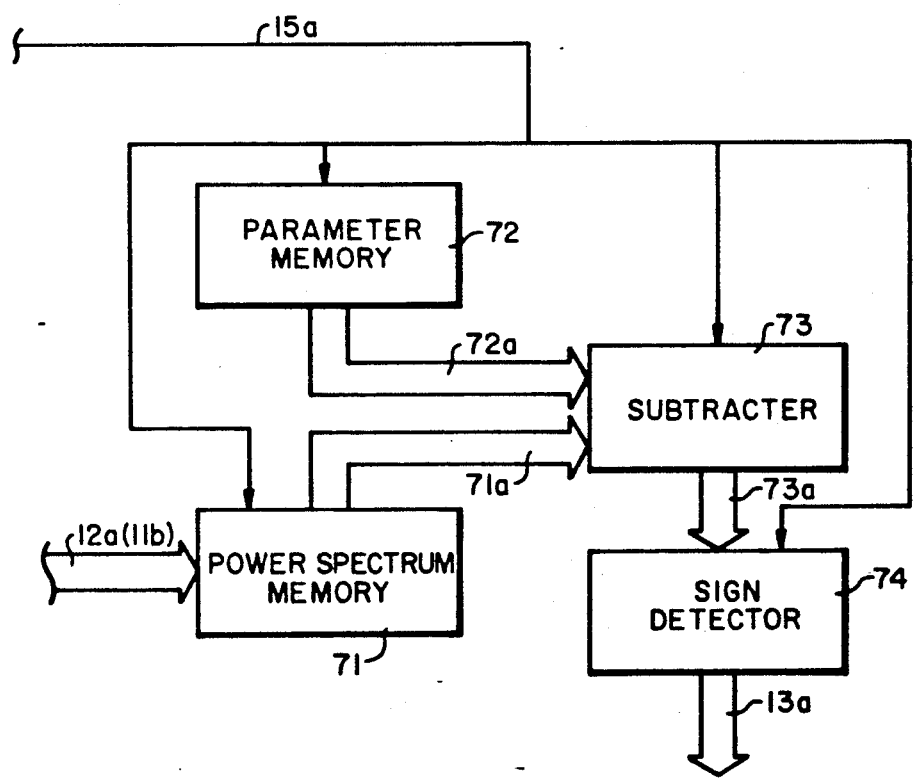
FIG. 6 is a detailed block diagram of the detecting means shown in FIG. 1.

FIG. 6 is a detailed block diagram of the detecting means shown in FIG. 1. A power spectrum memory 71 stores the data as to the level of the power spectrum signal supplied through the data bus 12a.

The power spectrum data through the data bus 12a corresponds to the level of the spectrum signal shown in FIG. 5(b). A parameter memory 72 stores a reference level L shown in FIG. 5(b). A subtracter 73 subtracts the reference level L received through a data bus 72a from the power spectrum data level received through a data bus 71a, and supplies the result to a sign detector 74 through the data bus 73a. The sign detector 74 detects whether the sign of the input signal is positive and produces an output signal which indicates that characters exist on the object if the sign of the input signal is positive. The output signal is supplied to the output means 14 through a data bus 13a.

The power spectrum memory 71, the parameter memory 72, the subtracter 73 and the sign detector 74 are connected to the control bus 15a and are controlled by the controlling means 15. Controlling means 15 may be, for example, a microprocessor.

Figure 7:
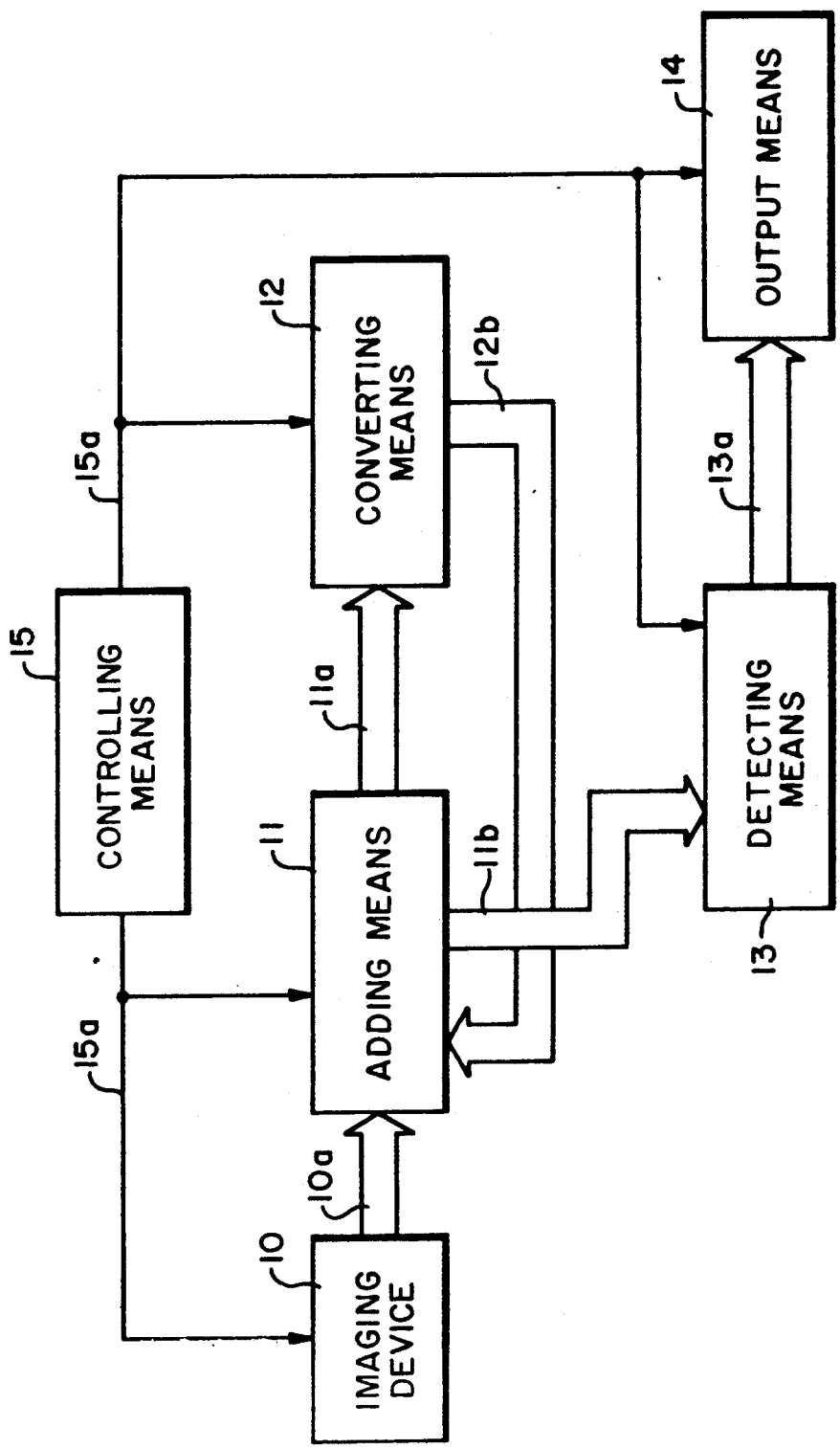
FIG. 7 is a block diagram of the imaging apparatus according to a second embodiment of this invention.

FIG. 7 is a block diagram of the imaging apparatus according to another embodiment of this invention. In FIG. 7, the image signal from the imaging device 10 is supplied to the converting means 12 through the data bus 10a, the adding means 11, and the data bus 11a without carrying out the adding operation of the adding means 11. The output signal of the converting means 12 is supplied to the adding means 11 through a data bus 12b. The adding means 11 adds this output signal of the converting means 12 and supplies a resultant signal to the detecting means 13 through a data bus 11b.

Figure 8:
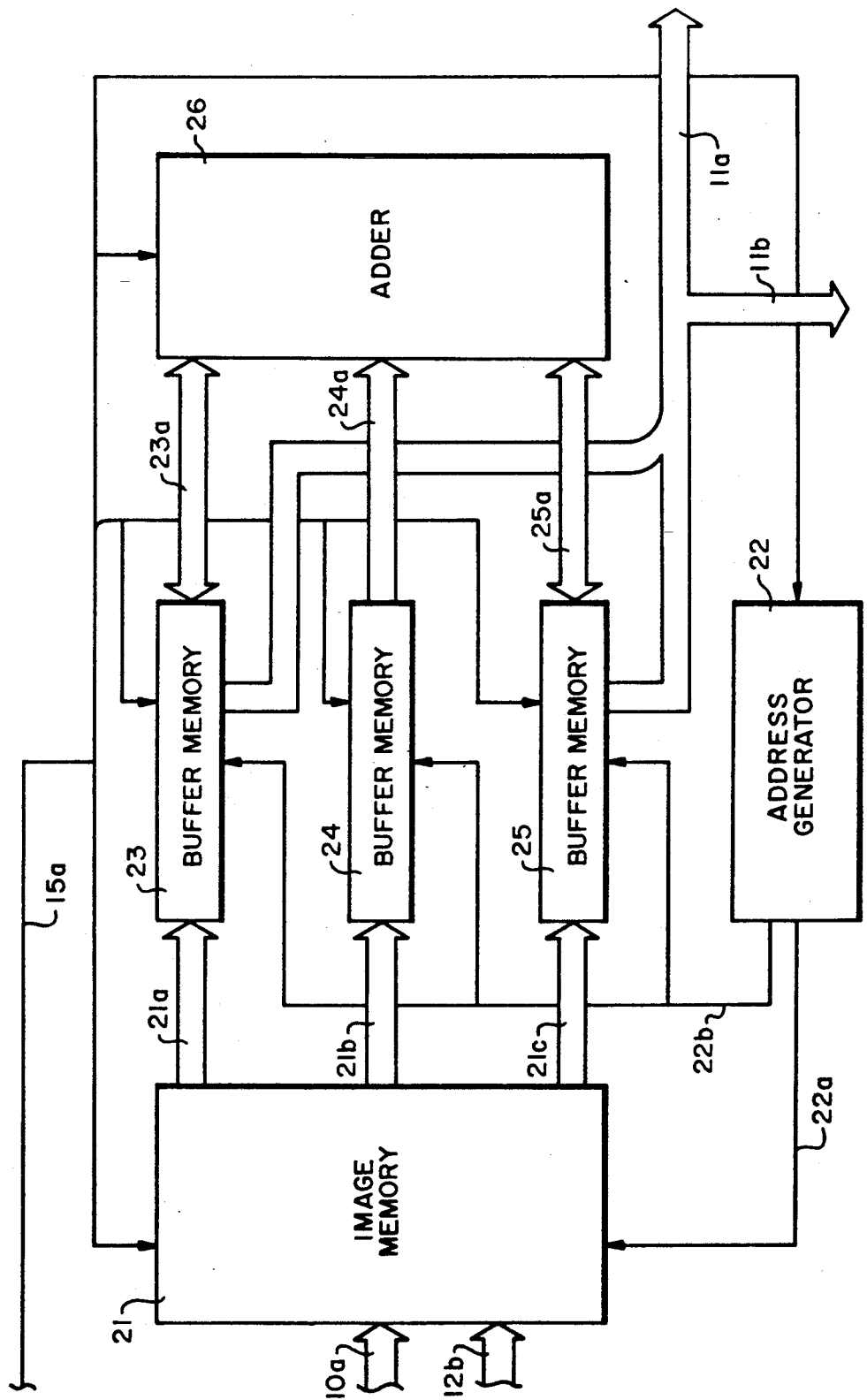
FIG. 8 is a detailed block diagram of the adding means shown in FIG. 7.

FIG. 8 is a detailed block diagram of the adding means 11 shown in FIG. 7. The imaging signal from the imaging device 10 is not supplied to the adder 26, but to the converting means 12 from the buffer memory 23 or 25 through a data bus 11a.

After the image memory 21 stores the power spectrum data received from the converting means 12 through the data bus 12b, the adding means 11 executes the same adding operation mentioned in FIG. 3 and supplies a resultant signal to the detecting means 13 through a data bus 11b.

FIG. 9 illustrates operations of the adding means 11 and the converting means 12 shown in FIG. 7 when an input image of the adding means 11 is a changing electronic image, that is, the image signal picked-up by the imaging device 110 has a motion stream. For example, when an imaging time corresponding to one image of the imaging device 10 is normally 33 milliseconds, and the object is being moved at a velocity of 5 meters per second, the moved distance of the object during the imaging time of the imaging device 10 is 16.5 centimeters. In this moved distance, the image signal from the imaging device 10 which is fixed has a stream 91a as shown in FIG. 9(a), and it is difficult to detect a feature of the image of the object in the same manner shown in FIG. 5. Under such circumstances, it is effective to generate the power spectrum signal before the adding operation. That is, the converting means 12 changes the image data corresponding to each portion 911, 912 . . . 91n of the image 91 into individual frequency spectrum data corresponding to the contrasting portions in the appearance of the object along a defined line of the image, as shown by arrow 91R. In FIG. 9(a), the image 91a has a stream which corresponds to the characters and the image 91b corresponds to the background. The resultant image 92 of a fourier transformation has symmetry with respect to the frequency shown in FIG. 9(b). Moreover, the power spectrum signals derived from this fourier transformation by the manner mentioned in FIG. 4 are shown in FIG. 9(c). The individual frequency spectrum signals 931 . . . 93n correspond to each frequency spectrum 1, . . . , 512 from zero to +f, as shown in FIG. 9(b). As to each frequency spectrum signal from −f to zero, it is not necessary to convert into each power spectrum signal, because it is the same spectrum signal as that from zero to +f. In the changing electronic image, an individual spectrum has no clear feature, as shown in FIG. 9(c). In the sum of these individual spectrum signals 931 . . . 93n, however, a clear feature 94 will appear as shown in FIG. 9(d). Accordingly, the power spectrum signals from the converting means 12 are supplied to the adding means 11 through the data bus 12b and the sum of the levels of the power spectrum signals is obtained by the same combining process as mentioned in FIG. 3. If a signal having a higher level than the reference level L appears in a given frequency on the sum of the levels of the power spectrum signals, this means that a feature, such as a character, exists on the image of the object.

Figure 10:
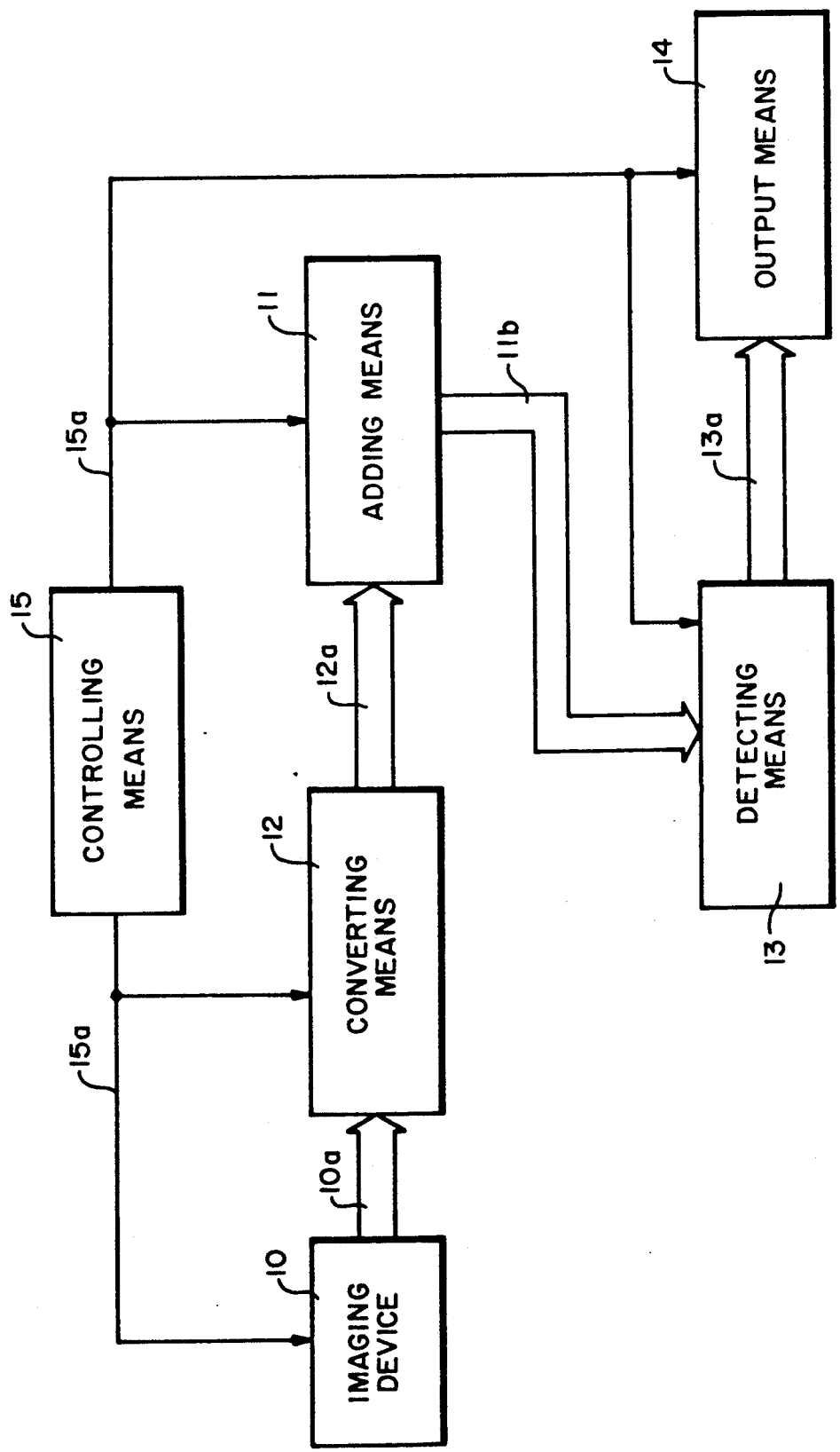
FIG. 10 is a block diagram of the imaging apparatus according to a third embodiment of this invention.

FIG. 10 is a block diagram of an imaging apparatus according to a further embodiment of this invention. This apparatus operates in the same manner as the previous embodiment, except that the converting means 12 is connected between the imaging device 10 and the adding means 17. This apparatus can detect a feature of the image in the same manner as mentioned in FIG. 7.

Figure 11:
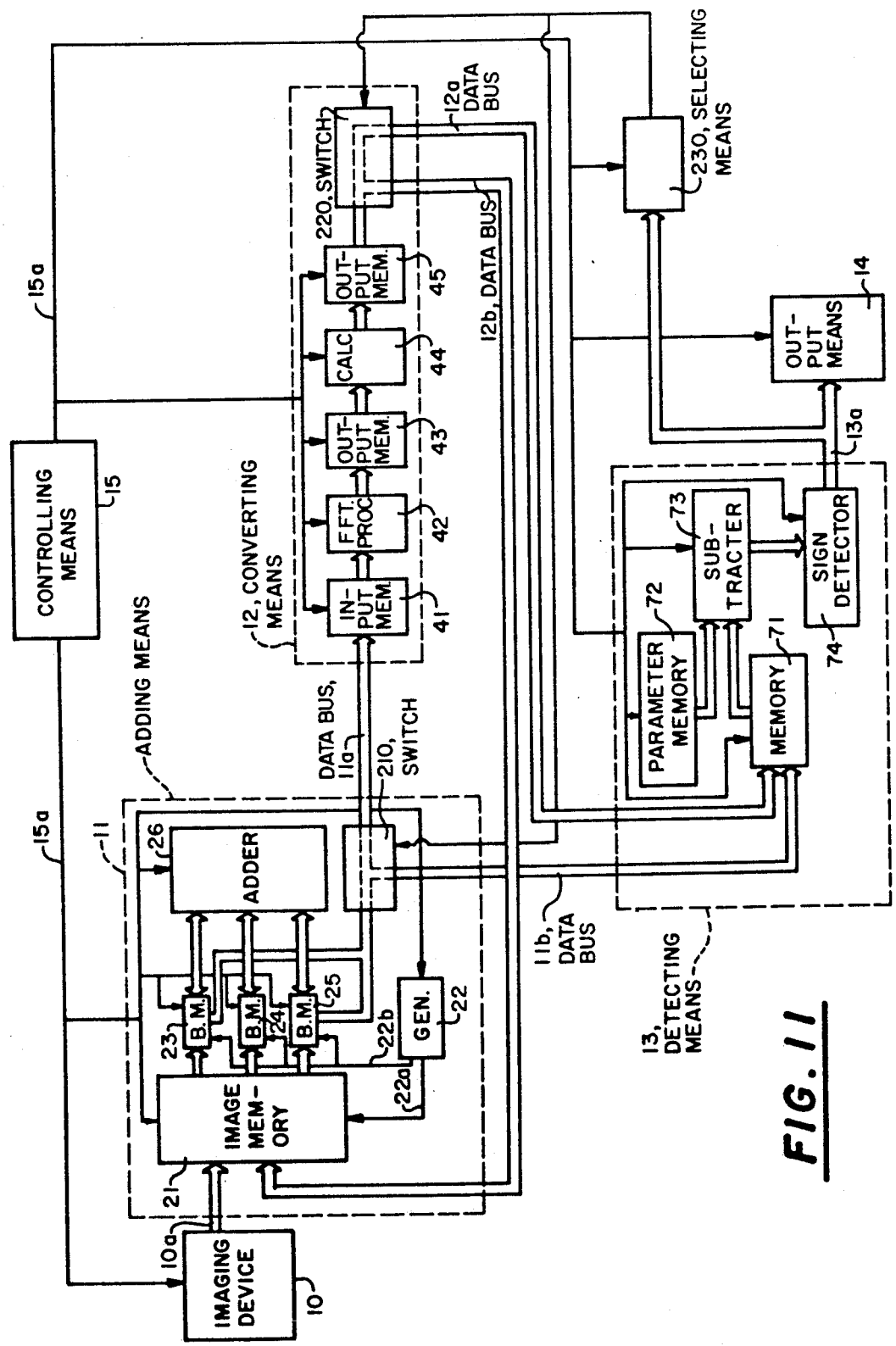
FIG. 11 is a block diagram of a fourth embodiment of this invention.

FIG. 11 is a block diagram of a still further embodiment of this invention suitable in both cases of an electronic still image and a changing electronic image. The adding means 11 includes a switch 210 for selecting either the data bus 11a or 11b and the converting means 12 includes a switch 220 for selecting either the data bus 12a or 12b. These switches 210, 220 are controlled by a selecting means 230, which is provided with the output signal of the detecting means 13 so that the operation mentioned in FIG. 5 or FIG. 9 can be executed. These switches 210,220 may be also shifted to manual control. When the detecting means 13 does not detect a feature of the image by one of the operations mentioned in FIG. 5 or FIG. 9, the selecting means 230 controls the switches 210, 220 to select the other operation in FIG. 5 or FIG. 9. According to this function, the apparatus shown in FIG. 11 can detect a feature of the image in both cases of an electronic still image and a changing electronic image.

Figure 9A:
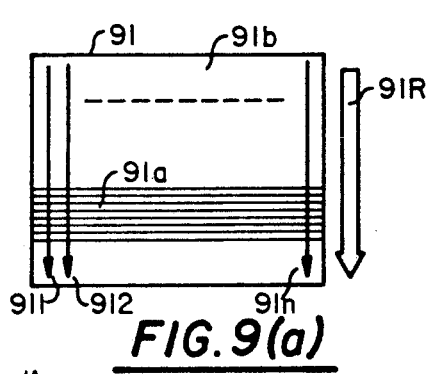
FIG. 9(a)-9(d) illustrate operations of the adding means and the converting means shown in FIG. 7.
Figure 9B:
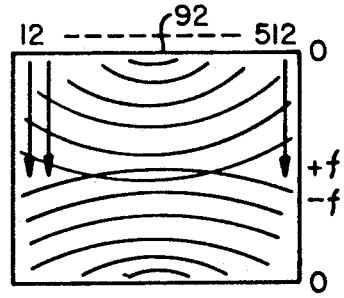
Figure 9C:
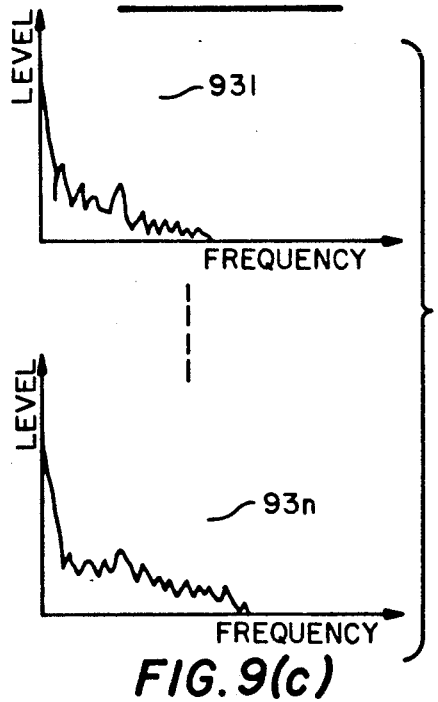
Figure 9D:
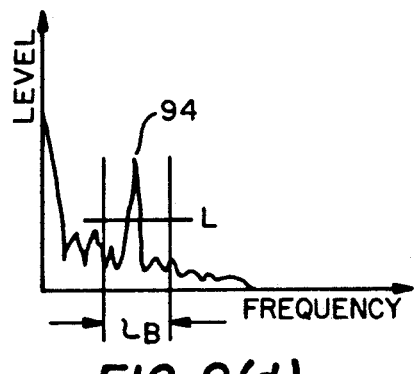
Figure 12:
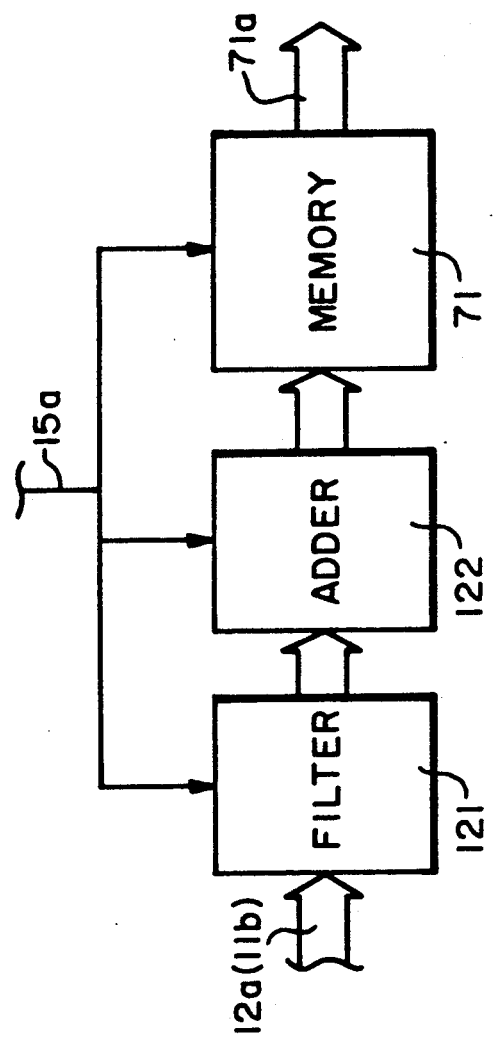
FIG. 12 is a block diagram of a configuration for adding the variable levels of a power spectrum signal within a predetermined frequency range.

If a frequency of the feature varies in accordance with a situation of the object, the feature will not be found on a specified frequency in the power spectrum signal. In this case, it is useful to execute an adding of the levels of the power spectrum signal within a predetermined frequency range B, as shown in FIG. 5(b) or FIG. 9(d). FIG. 12 is a block diagram of a configuration for adding the levels of the power spectrum signal within a predetermined frequency range. For example, a filter 121 extracts the power spectrum signal within a frequency range B in FIG. 5(b) or FIG. 9(d) from the signal received through the data bus 12a or 11b and supplies the resulting signal to an adder 122. The adder 122 adds the power spectrum signal levels within a frequency range B and supplies the sum of the signal levels to the memory 71 shown in FIG. 6 or FIG. 11. Thus, the detecting means 13 can detect a clear feature of the image.

In FIG. 11, the selecting means 230 may be provided with the output signal of the subtracter 73. Moreover, a detector may be provided for detecting whether the image signal picked-up by the imaging device 10 corresponds to an electronic still image or a changing electronic image, and an output signal of this detector may be supplied to the selecting means 230.

An apparatus according to this invention is also applicable to the case where the imaging device is a high-speed camera with a shutter speed of one millisecond, for example.

In one embodiment of the present invention, if the selected type of pattern, such as characters, of the image is relatively clear, the combined data corresponding to a defined portion of the image after the combining operation has a concave-convex waveform on a density profile with respect to the selected type of pattern. Therefore, the power spectrum signal of this image data has a prominent peak to indicate whether a selected type of pattern exists on the object. When the background noise is large or the printing is inclined on the object, the power spectrum signal may have no selected type of pattern because each pattern corresponding to the defined portion of the image is cancelled during the combining of the defined portions. In this case, the individual frequency spectrum signals may be combined fourier transformation of the image, as mentioned in reference to FIG. 9. Though the spectrum signals shown in FIG. 9(c) are not all the same or constant, they include a spatial frequency of a lateral fringe 91a which commonly corresponds to characters on the object. Accordingly a prominent feature appears, as shown in FIG. 9(d), by the combining of each spectrum signal shown in FIG. 9(c). Even with such combining, there may be a case when a feature does not appear due to a poor illuminative condition or a transit condition of the object. In such a case, it is useful to add the levels of the power spectrum signals within a frequency range B shown in FIG. 9(d), which has a center frequency assumed to have a peak value of the power spectrum signal. A clear feature will appear by this operation.

In the embodiment mentioned above, pre-process means such as a gradation converter of the image data may be used prior to the adding means 11 in accordance with type of image signal.

According to the present invention, it is possible to recognize the existence of characters etc. printed on the object easily and accurately regardless of a type of the image, such as an electrical still image or a changing electrical image. Moreover, it is possible with the present invention to provide an improved image detecting apparatus that is suitable for a detecting device to detect a feature or a flow on the surface of a material in a production process or assembly line.

Numerous modifications and variations of the present invention are possible in light above the teachings. It is therefore to be understood that, within the scope of the appended claims, the present invention can be practiced in a manner other than as specifically described herein.

What is claimed is:

1. An imaging apparatus, comprising:
   imaging means for generating image signals corresponding to the appearance of a physical object, the appearance including contrasting portions;
   means for transforming the image signals into a combined power spectrum signal having a level which varies in relation to the contrasting portions in the appearance of the object at a specified time, said transforming means including:
   adding means responsive to the imaging means for successively combining the image signals into a combined picture signal corresponding to the appearance of the object at the specified time, said adding means comprising:
   1) an image memory for storing image data from the image signals corresponding to the appearance of the object at the specified time;
   2) at least three buffer memories, each coupled to the image memory for storing a defined portion of the image data form the image memory;
   3) an adder for combining the defined portions stored in the buffer memories; and
   4) means for successively summing the defined portions from two of the buffer memories with the defined portion stored in the third of the buffer memories to obtain said combined picture signal, and
   converting means coupled to the adding means for converting the combined picture signal into the combined power spectrum signal; and
   detecting means for generating a detecting signal corresponding to the presence of a selected type of image pattern on the object when the level of the combined power spectrum signal exceeds a predetermined reference level.

2. The apparatus of claim 1, wherein the converting means comprises a first memory for temporarily storing picture data corresponding to the combined picture signal from the adding means;
   fourier transforming means for transforming the picture data from the first memory into a fourier frequency spectrum signal;
   power spectrum means for generating the combined power spectrum signal from the fourier frequency spectrum signal; and
   a second memory for storing power spectrum data corresponding to the combined power spectrum signal.

3. The apparatus of claim 2, wherein the fourier transforming means includes means for executing a one dimensional fourier transformation.

4. The apparatus of claim 1, wherein the detecting means comprises a spectrum memory for storing data corresponding to the level of the combined power spectrum signal;
   a parameter memory for storing the reference level;
   a subtracter for determining the difference between the levels stored in the spectrum memory and the parameter memory; and
   a detector for detecting whether the difference determined by the subtracter is positive.

5. The apparatus of claim 1, wherein the transforming means further includes switch means for selectively enabling said combining of said image signals into said combined picture signal corresponding to the appearance of the object at the specified time and said converting of the combined picture signal to the combined power spectrum signal, or converting the image signals into individual frequency spectrum signals, each corresponding to at least part of an image signal and combining the individual frequency spectrum signals into the power spectrum signal.

6. The apparatus of claim 1, wherein the detecting means includes means for comparing the level of the sum of the variable levels of the combined power spectrum signal within a predetermined frequency range with the reference level.

7. An imaging apparatus, comprising:
   imaging means for generating image signals corresponding to the appearance of a physical object, the appearance including contrasting portions;
   means for transforming the image signals into a combined power spectrum signal having a level which varies in relation to the contrasting portions in the appearance of the object at a specified time, said transforming means including:
   converting means coupled to the imaging means for changing the image signals into individual frequency spectrum signals, each corresponding to the contrasting portions in the appearance of the object along a defined line, said converting means comprising:
   1) a first memory for temporarily storing image data corresponding to the image signals from the imaging means;
   2) fourier transforming means for transforming the image data from the first memory into fourier frequency spectrum signals, each corresponding to the contrasting portions in the appearance of the object along a defined line, said fourier transforming means including means for executing a one dimensional fourier transformation;

3) power spectrum means for generating the power spectrum signals from the fourier frequency spectrum signals; and 4) a second memory for storing power spectrum data corresponding to the power spectrum signals and supplying said power spectrum data as said individual frequency spectrum signals, and adding means for combining the individual frequency spectrum signals into the combined power spectrum signal; and detecting means for generating a detecting signal corresponding to the presence of a selected type of image pattern on the object when the level of the combined power spectrum signal exceeds a predetermined reference level.

8. The apparatus of claim 7, wherein the detecting means comprises:

a spectrum memory for storing data corresponding to the level of the combined power spectrum signal;

a parameter memory for storing the reference level;

a subtracter for determining the difference between the levels stored in the spectrum memory and the parameter memory; and a detector for detecting whether the difference determined by the subtracter is positive.

9. The apparatus of claim 7, wherein the transforming means further includes switch means for selectively combining the image signals into a combined picture signal corresponding to the appearance of the object at the specified time and converting the combined picture signal to the combined power spectrum signal, or enabling said converting of said image signals into individual frequency spectrum signals and said combining of the individual frequency spectrum signals into the combined power spectrum signal.

10. The apparatus of claim 7, wherein the detecting means includes means for comparing the level of the sum of the variable levels of the combined power spectrum signal within a predetermined frequency range with the reference level.

11. An imaging apparatus, comprising:

imaging means for generating image signals corresponding to the appearance of a physical object, the appearance including contrasting portions;

means for transforming the image signals into a combined power spectrum signal having a level which varies in relation to the contrasting portions in the appearance of the object at a specified time, said transforming means including:

converting means coupled to the imaging means for changing the image signals into individual frequency spectrum signals, each corresponding to the contrasting portions in the appearance of the object along a defined line, and adding means for combining the individual frequency spectrum signal into the combined power spectrum signal, said adding means including:

1) an image memory for storing individual data corresponding to the individual frequency spectrum signals from the converting means;

2) at least three buffer memories, each for storing a defined portion of the individual data from the image memory; and 3) an adder for combining the defined portions stored in the buffer memories, said adder including means for successively summing the defined portions from two of the buffer memories with the defined portion stored in the third of the buffer memories; and detecting means for generating a detecting signal corresponding to the presence of a selected type of image pattern on the object when the level of the combined power spectrum signal exceeds a predetermined reference level.

12. The apparatus of claim 11, wherein the converting means comprises:

a first memory for temporarily storing image data corresponding to the image signals from the imaging means;

fourier transforming means for transforming the image data from the first memory into fourier frequency spectrum signals, each corresponding to the contrasting portions in the appearance of the object along a defined line;

power spectrum means for generating the power spectrum signals from the fourier spectrum signals; and a second memory for storing power spectrum data corresponding to the power spectrum signals and supplying said power spectrum data as said individual spectrum signals.

13. The apparatus of claim 12, wherein the fourier transforming means includes means for executing a one-dimensional fourier transformation.

14. The apparatus of claim 11, wherein the detecting means comprises:

a spectrum memory for storing data corresponding to the level of the combined power spectrum signal;

a parameter memory for storing the reference level;

a subtracter for determining the difference between the levels stored in the spectrum memory and the parameter memory; and a detector for detecting whether the difference determined by the subtracter is positive.

15. The apparatus of claim 11, wherein the transforming means further includes switch means for selectively combining the image signals into a combined picture signal corresponding to the appearance of the object at the specified time and converting the combined picture signal to the combined power spectrum signal, or enabling said converting of said image signals into individual frequency spectrum signals and said combining of the individual frequency spectrum signals into the combined power spectrum signal.

16. The apparatus of claim 11, wherein the detecting means includes means for comparing the level of the sum of the variable levels of the combined power spectrum signal within a predetermined frequency range with the reference level.

* * * * *